United States Patent
Kawakami

(10) Patent No.: US 8,223,301 B2
(45) Date of Patent: Jul. 17, 2012

(54) ELECTRO-OPTICAL DEVICE AND ELECTRONIC DEVICE HAVING PARTICULAR DIELECTRIC LAYERS

(75) Inventor: Yasushi Kawakami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 526 days.

(21) Appl. No.: 12/539,735

(22) Filed: Aug. 12, 2009

(65) Prior Publication Data

US 2010/0079686 A1  Apr. 1, 2010

(30) Foreign Application Priority Data

Sep. 29, 2008 (JP) ................. 2008-249802

(51) Int. Cl.
*G02F 1/1335* (2006.01)
*G02F 1/1333* (2006.01)
(52) U.S. Cl. ............. 349/113; 349/114; 349/5; 349/138
(58) Field of Classification Search .................. 349/113, 349/114, 5, 138
See application file for complete search history.

(56) References Cited

U.S. PATENT DOCUMENTS 7,162,109 B2 * 1/2007 Nakada et al. ..................... 385/2
7,755,717 B2 * 7/2010 Zhang et al. ..................... 349/96

FOREIGN PATENT DOCUMENTS

JP 11-002707 1/1999
JP 11002707 A * 1/1999

* cited by examiner

*Primary Examiner* — Mike Qi
(74) *Attorney, Agent, or Firm* — Lowe Hauptman Ham & Berner, LLP

(57) ABSTRACT

An electro-optical device includes a first substrate and a translucent second substrate facing each other, a liquid crystal layer disposed between the first substrate and the second substrate, a reflective electrode that is disposed between the first substrate and the liquid crystal layer, a translucent electrode that is disposed between the second substrate and the liquid crystal layer, a first dielectric layer that is disposed between the reflective electrode and the liquid crystal layer and includes a plurality of dielectric films, and a second dielectric layer that is disposed between the translucent electrode and the liquid crystal layer and includes at least one dielectric film.

11 Claims, 6 Drawing Sheets

ELECTRO-OPTICAL DEVICE AND ELECTRONIC DEVICE HAVING PARTICULAR DIELECTRIC LAYERS

RELATED APPLICATIONS

The present application is based on, and claims priority from, Japanese Application Number 2008-249802, filed Sep. 29, 2008, the disclosure of which is hereby incorporated by reference herein in its entirety.

BACKGROUND

1. Technical Field

The present invention relates to a reflection-type electro-optical device and an electronic device that includes the electro-optical device.

2. Related Art

As one of various electro-optical devices, a reflective liquid crystal device includes a pair of substrates with a liquid crystal layer interposed therebetween, a reflective electrode disposed on one of the substrates, and a translucent electrode disposed on the other of the substrates. One of the reflective electrode and the translucent electrode constitutes a pixel electrode, and the other constitutes a common electrode. In such an electro-optical device, the reflective electrode is formed of a metallic material, such as an aluminum material or a silver material, and the translucent electrode is formed, for example, of indium tin oxide (ITO). The reflective electrode desirably has a high reflectivity. However, the formation of a high-refractive index layer, such as an alignment film, on the reflective electrode reduces the reflectivity. Thus, Japanese Patent Application Publication No. 11-2707 proposes forming a reflectance improver film formed of a plurality of dielectric films on a reflective electrode.

In electro-optical devices, an alternating-current electric field is applied to a liquid crystal layer through a reflective electrode and a translucent electrode. Since a pixel electrode and a common electrode have different work functions, the electric field applied to the liquid crystal layer is asymmetrical. For example, ITO of a translucent electrode has a work function of approximately 5.0 eV, whereas aluminum of a reflective electrode has a work function of approximately 3.2 eV. Thus, in an electro-optical device, displaying a certain pattern for a long period of time often causes failures, such as burn-in. Such failures also occur in an electro-optical device that has a reflectance improver film formed of a dielectric multilayer film on a reflective electrode, as described in Japanese Patent Application Publication No. 11-2707. To prevent burn-in, the voltages applied to the reflective electrode and the translucent electrode are often offset to secure symmetry of the electric field applied to the liquid crystal layer. However, the symmetry may be lost owing to ambient temperature variations or time-dependent changes.

SUMMARY

An advantage of some aspects of the invention is that it provides an electro-optical device that includes a reflective electrode having an improved reflectivity and that is free of failures, such as burn-in, even when an alternating-current electric field is applied to a liquid crystal layer. Another advantage of some aspects of the invention is that it provides an electronic device that includes the electro-optical device.

To solve the above-mentioned problems, an electro-optical device according to an aspect of the invention includes a first substrate and a translucent second substrate facing each other, a liquid crystal layer disposed between the first substrate and the second substrate, a reflective electrode that is disposed between the first substrate and the liquid crystal layer and constitutes one of a pixel electrode and a common electrode, a translucent electrode that is disposed between the second substrate and the liquid crystal layer and constitutes the other of the pixel electrode and the common electrode, a first dielectric layer that is disposed between the reflective electrode and the liquid crystal layer and includes a plurality of dielectric films, and a second dielectric layer that is disposed between the translucent electrode and the liquid crystal layer and includes at least one dielectric film.

In this electro-optical device, the first dielectric layer formed of a plurality of dielectric films is formed on the reflective electrode and functions as a reflectance improver film. The reflective electrode therefore exhibits a high reflectivity. This improves display luminance, providing well-lighted display. When the first dielectric layer is formed on the reflective electrode, burn-in in alternating current operation of the liquid crystal layer can be prevented with a simple structure. More specifically, in the presence of the first dielectric layer on the reflective electrode, the formation of the second dielectric layer on the translucent electrode can match or approximate the work function of the reflective electrode to the work function of the translucent electrode. Even in alternating current operation of the liquid crystal layer, therefore, a symmetric electric field can be applied to the liquid crystal layer. Thus, in the electro-optical device, displaying a certain pattern for a long period of time does not cause burn-in.

Preferably, a dielectric film adjacent to the liquid crystal layer in the first dielectric layer is formed of the same material as a dielectric film adjacent to the liquid crystal layer in the second dielectric layer. Employing such a structure can match the work function of the reflective electrode to the work function of the translucent electrode, allowing a symmetric electric field to be applied to the liquid crystal layer. Thus, in the electro-optical device, displaying a certain pattern for a long period of time does not cause burn-in.

Preferably, the second dielectric layer comprises only the one dielectric film. A decrease in the capacity of the second dielectric layer disposed on the translucent electrode will reduce the voltage applied to the liquid crystal layer. A second dielectric layer which comprises only the one dielectric film can therefore increase the capacity of the second dielectric layer, thus preventing a reduction in the voltage applied to the liquid crystal layer. Thus, the liquid crystal layer can be suitably operated without increasing the operation voltage.

According to an aspect of the invention, the reflective electrode constitutes a pixel electrode, and the translucent electrode constitutes a common electrode. Alternatively, the reflective electrode may constitute a common electrode, and the translucent electrode may constitute a pixel electrode.

According to another aspect of the invention, the reflective electrode is formed of an aluminum material, such as aluminum or an aluminum alloy, or a silver material, such as silver or a silver alloy. Preferably, the reflective electrode is formed of an aluminum material in terms of cost and workability, such as etching.

An electro-optical device according to an aspect of the invention can be used as an electronic device such as a mobile phone or a mobile computer. An electro-optical device according to an aspect of the invention can also be used as a projection display. Such a projection display includes a light source for providing light to the electro-optical device, and a projection optical system for projecting light modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
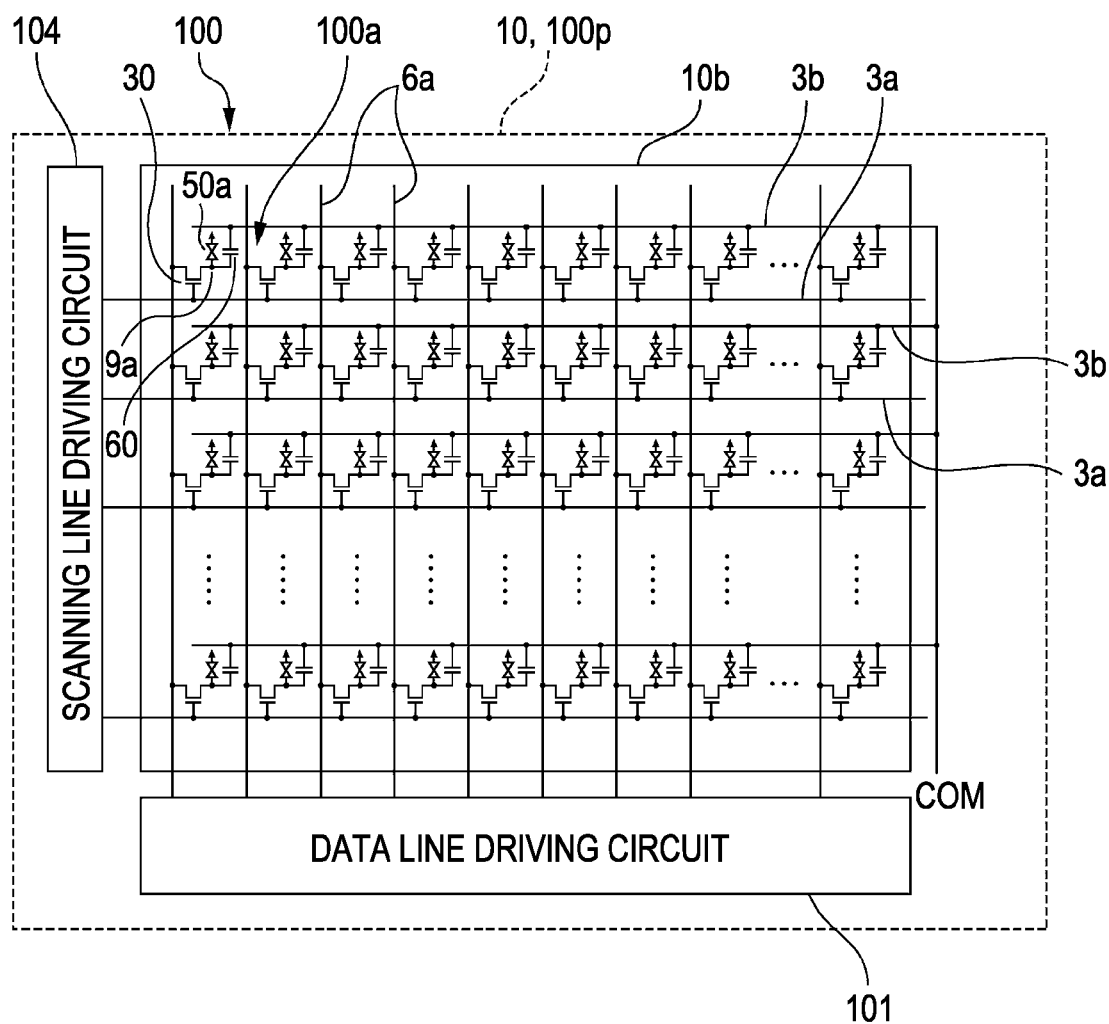
FIG. 1 is a block diagram of the electrical structure of a reflection-type electro-optical device according to an embodiment of the invention.

Embodiments of the invention will be described below with reference to the drawings. In a reflective liquid crystal device (reflection-type electro-optical device), a reflective electrode constitutes one of a pixel electrode and a common electrode, and a translucent electrode constitutes the other of the pixel electrode and the common electrode. In the following description, basically, a reflective electrode constitutes a pixel electrode, and a translucent electrode constitutes a common electrode. For the sake of convenient reference, the layers and the components in the drawings referred to in the following description are independently appropriately magnified. Although the source and the drain are swapped when the direction of an electric current flowing through a field-effect transistor is reversed, for convenience, the drain is connected to a pixel electrode, and the source is connected to a data line in the following description.

Whole Structure

FIG. 1 is a block diagram of the electrical structure of an electro-optical device according to an embodiment of the invention. An electro-optical device 100 includes a liquid crystal panel 100p. The liquid crystal panel 100p includes a pixel region 10b, which includes a matrix of pixels 100a in the central area thereof. In the liquid crystal panel 100p, a plurality of data lines 6a and a plurality of scanning lines 3a crisscross the pixel region 10b in a first substrate 10 described below, and pixels 100a are disposed on their intersections. Each of the pixels 100a includes a field-effect transistor 30 as a pixel switching element and a pixel electrode 9a described below. The source of the field-effect transistor 30 is electrically connected to a data line 6a, the gate of the field-effect transistor 30 is electrically connected to a scanning line 3a, and the drain of the field-effect transistor 30 is electrically connected to a pixel electrode 9a.

A scanning line driving circuit 104 and a data line driving circuit 101 are disposed outside the pixel region 10b on the first substrate 10. The data line driving circuit 101 is electrically connected to one end of each of the data lines 6a and successively sends picture signals from an image processing circuit to the data lines 6a. The scanning line driving circuit 104 is electrically connected to one end of each of the scanning lines 3a and successively sends scanning signals to the scanning lines 3a.

In each of the pixels 100a, the pixel electrode 9a and a common electrode, which is disposed on a counter substrate described below on the opposite side of a liquid crystal layer, constitute a liquid crystal capacitor 50a. Each of the pixels 100a is provided with a storage capacitor 60 in parallel with the liquid crystal capacitor 50a to prevent fluctuations in picture signals held by the liquid crystal capacitor 50a. Capacity lines 3b extend parallel to the scanning lines 3a across a plurality of pixels 100a to constitute the storage capacitors 60.

Structure of Liquid Crystal Panel and Element Substrate

Figure 2A:
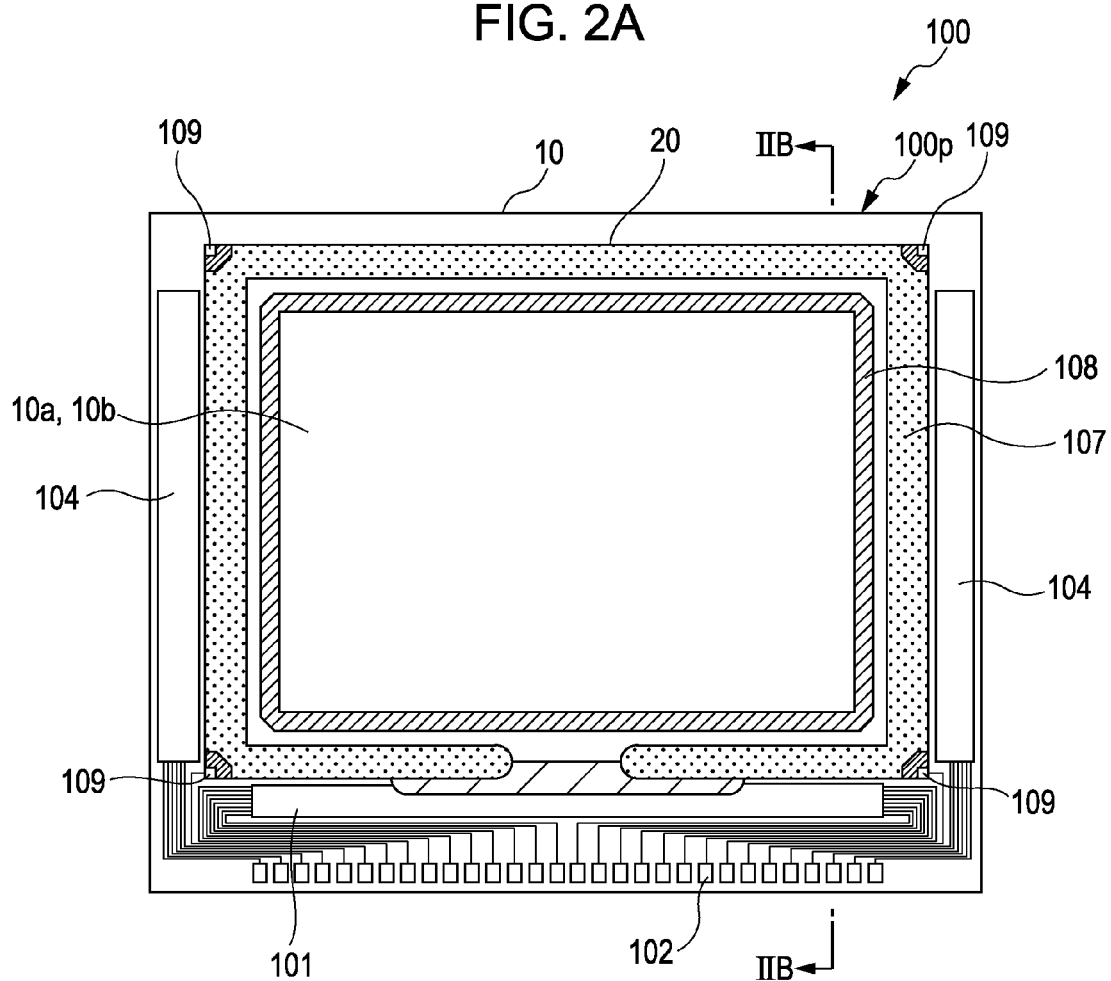
FIG. 2A is a plan view of a liquid crystal panel and other components of a reflection-type electro-optical device according to an embodiment of the invention viewed from a counter substrate side.
Figure 2B:
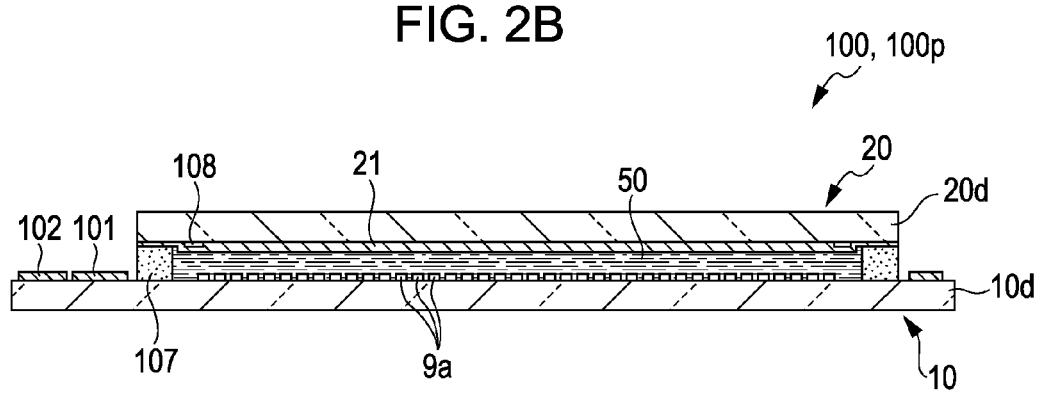
FIG. 2B is a cross-sectional view taken along the line IIB-IIB of FIG. 2A.

FIG. 2A is a plan view of a liquid crystal panel 100p with other components of an electro-optical device 100 according to an embodiment of the invention viewed from a counter substrate side, and FIG. 2B is a cross-sectional view taken along the line IIB-IIB of FIG. 2A. In the liquid crystal panel 100p of the electro-optical device 100, the first substrate 10 (element substrate) and a second substrate 20 (counter substrate) are bonded together with a predetermined clearance using a sealant 107, which is disposed along the edge of the second substrate 20. The sealant 107 is an adhesive containing a photo-curable resin or a thermosetting resin and contains a gap material, such as glass fibers or glass beads, to secure a predetermined clearance between the first substrates 10 and second substrates 20. In the present embodiment, the base of the first substrate 10 is a translucent substrate 10d, and the base of the second substrate 20 is also a translucent substrate 20d.

On the first substrate 10, the data line driving circuit 101 and a plurality of terminals 102 are disposed outside the sealant 107 along a first edge of the first substrate 10, and the scanning line driving circuit 104 is disposed along a second edge of the first substrate 10 adjacent to the first edge. A conducting member 109 for electrically connecting the first substrate 10 to the second substrate 20 is disposed at least one of the corners of the second substrate 20.

While details are described below, a matrix of reflective pixel electrodes 9a (reflective electrodes) formed of an aluminum material, such as aluminum or an aluminum alloy, or a silver material, such as silver or a silver alloy, is formed on the first substrate 10. In the present embodiment, the pixel electrodes 9a are formed of an aluminum material, such as aluminum or an aluminum alloy.

On the second substrate 20, a frame 108 formed of a light-shielding material is disposed inside the sealant 107. An area inside the frame 108 is an image display area 10a. A common electrode 21 (translucent electrode) formed of an indium tin oxide (ITO) film is also disposed on the second substrate 20. A light-shielding film referred to as a black matrix or black stripes (not shown) facing the spaces between the pixel electrodes 9a may be disposed on the second substrate 20.

In some cases where dummy pixels facing the frame 108 are disposed in the pixel region 10b, part of the pixel region 10b excluding the dummy pixels serves as the image display area 10a.

In such a reflection-type electro-optical device 100, light incident from the second substrate 20 is reflected by the pixel electrodes 9a and exits from the second substrate 20, whereby light is modulated by the liquid crystal layer 50 in each of the pixels, thereby displaying an image. The electro-optical device 100 can be used as a color display for use in electronic devices, such as mobile computers and mobile phones. In such a case, a color filter (not shown) or a protective film (not shown) is disposed on the second substrate 20. Depending on the type of the liquid crystal layer 50, that is, the mode of operation, such as a twisted nematic (TN) mode or a super twisted nematic (STN) mode, or a normally white mode or a normally black mode, a polarizing film, a retardation film, or a polarizer is disposed in a proper direction on the plane of incidence of the second substrate 20. The electro-optical device 100 can also be used as a light valve for RGB in a projection display (liquid crystal projector) described below. In this case, RGB light beams separated by a dichroic mirror for RGB color separation enter the corresponding electro-optical devices 100 for RGB as projected light. Thus, a color filter is not necessary.

Structure of Pixels

Figure 3A:
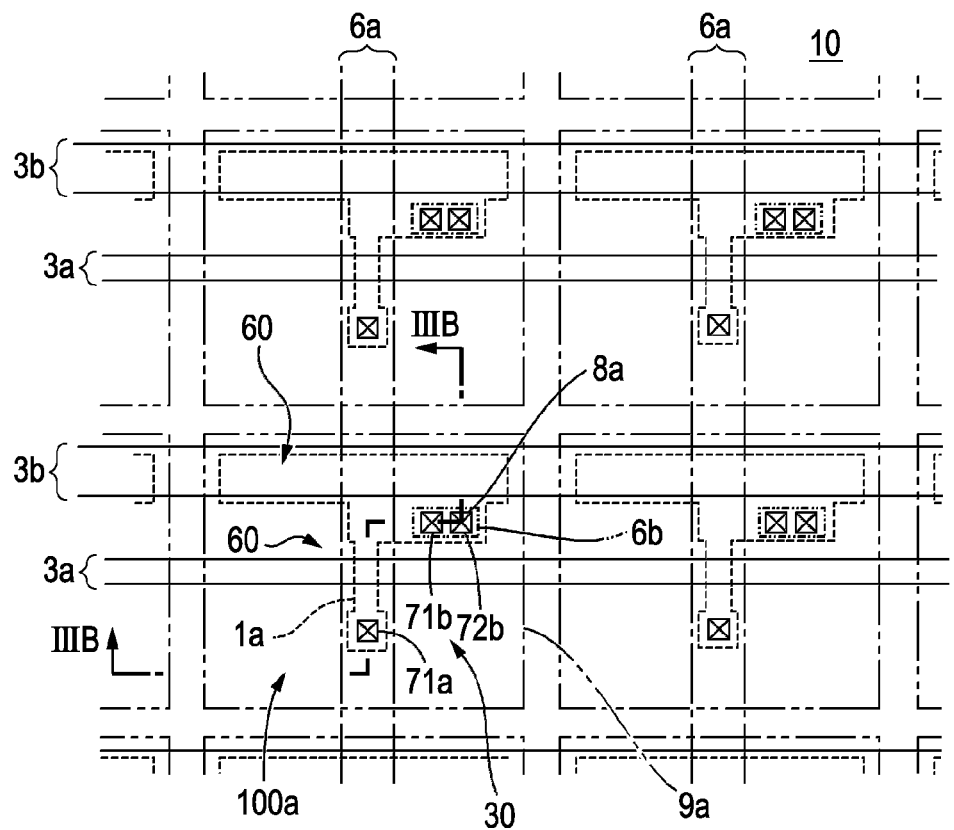
FIG. 3A is a plan view of adjacent pixels in an element substrate of a reflection-type electro-optical device according to one embodiment of the invention.
Figure 3B:
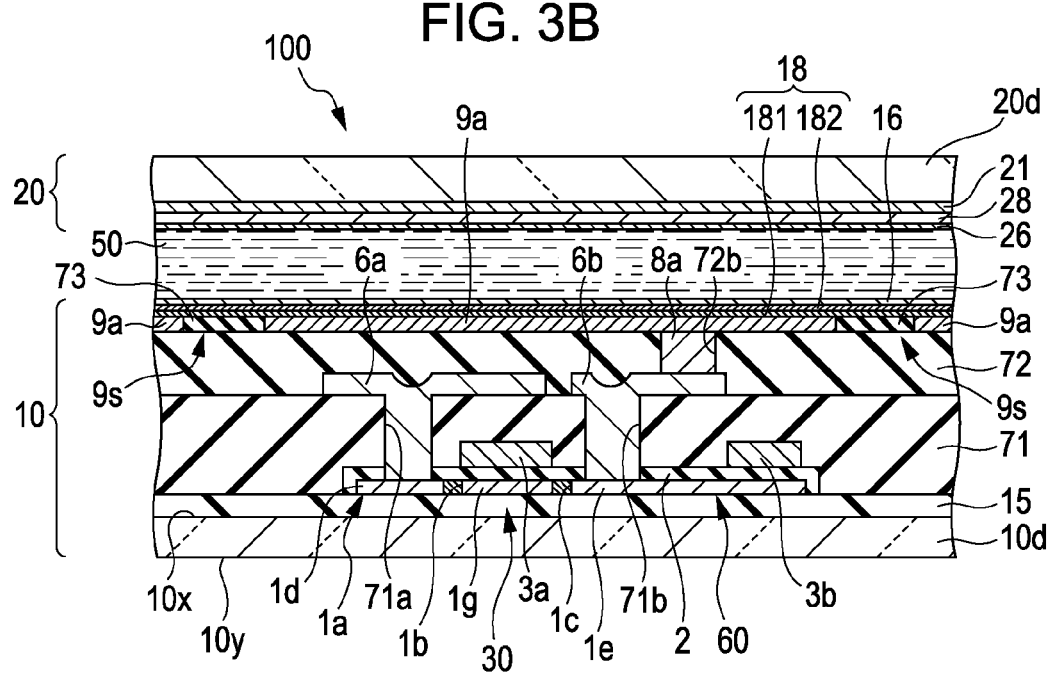
FIG. 3B is a cross-sectional view of the electro-optical device taken along the line IIIB-IIIB of FIG. 3A.

FIG. 3A is a plan view of adjacent pixels in a first substrate 10 of a reflection-type electro-optical device 100 according to one embodiment of the invention. FIG. 3B is a cross-sectional view of the electro-optical device 100 taken along the line IIIB-IIIB of FIG. 3A. In FIG. 3A, the alternate long and short dashed lines denote data lines 6a, the solid lines denote scanning lines 3a and capacity lines 3b, the fine dotted lines denote semiconductor layers 1a, and the chain double-dashed lines denote pixel electrodes 9a.

The first substrate 10 includes a translucent substrate 10d, which may be formed of a quartz substrate or a glass substrate and has a first surface 10x and a second surface 10y, a translucent base insulating layer 15 formed, for example, of a silicon oxide film disposed on the first surface 10x, and an N-channel field-effect transistor 30 disposed on the translucent base insulating layer 15 overlapping with the pixel electrode 9a. The field-effect transistor 30 has a lightly doped drain (LDD) structure that includes a channel region 1g, a low-concentration source region 1b, a high-concentration source region 1d, a low-concentration drain region 1c, and a high-concentration drain region 1e in a semiconductor layer 1a formed of an island-shaped polysilicon film or an island-shaped single-crystal semiconductor layer. A translucent gate insulating layer 2 formed of a silicon oxide film or a silicon nitride film is disposed on the semiconductor layer 1a. A gate electrode (scanning line 3a) formed of a metal film or a doped silicon film is disposed on the gate insulating layer 2. The capacity line 3b is disposed on the gate insulating layer 2 opposite a portion extending from the high-concentration drain region 1e in the semiconductor layer 1a, thus forming the storage capacitor 60.

While the field-effect transistor 30 has a LDD structure in the present embodiment, a high-concentration source region and a high-concentration drain region may be self-aligned in the scanning line 3a. While the gate insulating layer 2 is formed of a silicon oxide film formed by thermal oxidation in the present embodiment, the gate insulating layer 2 may be formed of a silicon oxide film or a silicon nitride film formed by chemical vapor deposition (CVD). Alternatively, the gate insulating layer 2 may be formed of a multilayer film composed of a silicon oxide film formed by thermal oxidation and a silicon oxide film or a silicon nitride film formed by CVD. The first substrate 10 may be a single-crystal silicon substrate.

First and second interlayer insulating films 71 and 72 formed of a translucent insulating film, such as a silicon oxide film or a silicon nitride film, are disposed on top of the field-effect transistor 30. The data line 6a and a drain electrode 6b formed of a metal film or a doped silicon film are disposed on the first interlayer insulating film 71. The data line 6a is electrically connected to the high-concentration source region 1d through a contact hole 71a formed in the first interlayer insulating film 71. The drain electrode 6b is electrically connected to the high-concentration drain region 1e through a contact hole 71b formed in the first interlayer insulating film 71. The island-shaped pixel electrode 9a is disposed on the second interlayer insulating film 72. The pixel electrode 9a is electrically connected to the drain electrode 6b through a contact hole 72b formed in the second interlayer insulating film 72. The contact hole 72b is filled with an electroconductive film called a plug 8a, and the pixel electrode 9a is electrically connected to the drain electrode 6b through the plug 8a.

A first dielectric layer 18 and a first alignment film 16 described below are disposed on the pixel electrode 9a in this order. The second interlayer insulating film 72 is flush with the plug 8a, and the pixel electrode 9a is disposed on the flat surface.

The second substrate 20 includes a common electrode 21 formed of an ITO film on the entire surface of the translucent substrate 20d opposite to the first substrate 10, and a second dielectric layer 28 and a second alignment film 26 described below on the common electrode 21.

The first substrate 10 and the second substrate 20 are oppositely disposed such that the pixel electrode 9a and the common electrode 21 face each other. The liquid crystal layer 50 formed of an electro-optic material is enclosed in a space surrounded by the first substrate 10, the second substrate 20, and the sealant 107. In the absence of an electric field generated by the pixel electrode 9a, the liquid crystal layer 50 is oriented by the first and second alignment films 16 and 26. The liquid crystal layer 50 may be formed of one or a plurality of nematic liquid crystals. The first and second alignment films 16 and 26 may be formed of polyimide films subjected to a rubbing process.

Spaces between adjacent pixel electrodes 9a are filled with a surface insulating film 73 to allow uniform rubbing of the first alignment film 16. Thus, the pixel electrode 9a is flush with the surface insulating film 73, and the first dielectric layer 18 and the first alignment film 16 are disposed on the flat surface.

Structure of First Dielectric Layer 18

In the electro-optical device 100 according to the present embodiment, the pixel electrode 9a is a reflective electroconductive film formed of an aluminum material. However, the formation of a first alignment film directly on the pixel electrode 9a will reduce the reflectivity. Thus, in the present embodiment, the first dielectric layer 18 is disposed between the pixel electrode 9a and the first alignment film 16 (on top of the pixel electrode 9a). The first dielectric layer 18 is a dielectric multilayer film including a plurality of dielectric films and functions as a reflectance improver film. This provides high reflectivity even when the first alignment film 16 is disposed above the pixel electrode 9a.

The first dielectric layer 18 is a dielectric multilayer film in which at least one low-refractive index layer 181 formed of a dielectric film having a low refractive index and at least one high-refractive index layer 182 formed of a dielectric film having a higher refractive index than the low-refractive index layer 181 are alternately stacked. The first dielectric layer 18 may be formed of one low-refractive index layer 181 and one high-refractive index layer 182 or may be formed of a plurality of sets of the low-refractive index layer 181 and the high-refractive index layer 182 (for example, two sets). In the present embodiment, the first dielectric layer 18 is formed of one low-refractive index layer 181 and one high-refractive index layer 182.

The term "low refractive index" and "high refractive index", as used herein, refer to a relative refractive index and do not mean a particular value of refractive index. For example, if a layer of a refractive index below 1.7 is defined as the low-refractive index layer, and if a layer of a refractive index of 1.7 or more is defined as the high-refractive index layer, the low-refractive index layer 181 and the high-refractive index layer 182 can be formed of the following material or a combination thereof.

Low-Refractive Index Layer 181:
  Magnesium fluoride ($MgF_2$): refractive index=1.38
  Silicon dioxide ($SiO_2$): refractive index=1.46
  Lanthanum fluoride ($LaF_3$): refractive index=1.59
  Aluminum oxide ($Al_2O_3$): refractive index=1.62
  Cerium fluoride ($CeF_3$): refractive index=1.63

High-Refractive Index Layer 182:
  Indium oxide ($In_2O_3$): refractive index=2.00
  Silicon nitride (SiN): refractive index=2.05
  Titanium oxide ($TiO_2$): refractive index=2.10
  Zirconium oxide ($ZrO_2$): refractive index=2.10
  Tantalum oxide ($Ta_2O_5$): refractive index=2.10
  Tungsten oxide ($WO_3$): refractive index=2.35
  Zinc sulfide (ZnS): refractive index=2.35
  Cerium oxide ($CeO_2$): refractive index=2.42

The optical thickness of the low-refractive index layer 181 and the optical thickness of the high-refractive index layer 182 are set at one-fourth of a predetermined wavelength $\lambda_0$. The first dielectric layer 18 is formed at least above the pixel electrodes 9a. In the present embodiment, the first dielectric layer 18 is formed on the entire or substantially entire surface of the first substrate 10.

The predetermined wavelength $\lambda_0$ may be a wavelength in a visible range. The predetermined wavelength $\lambda_0$ for the low-refractive index layer 181 may be the same as or different from the predetermined wavelength $\lambda_0$ for the high-refractive index layer 182.

Structure of Second Dielectric Layer 28

In alternating current operation of the liquid crystal layer 50 in the electro-optical device 100, a difference in work function between the pixel electrode 9a and the common electrode 21 results in an asymmetric electric field applied to the liquid crystal layer 50. Thus, in the electro-optical device 100, displaying a certain pattern for a long period of time causes failures, such as burn-in. To prevent the failures, in the electro-optical device 100 according to the present embodiment, the first dielectric layer 18 formed of a dielectric multilayer film disposed on the pixel electrodes 9a is utilized to match or approximate the work function of the pixel electrodes 9a to the work function of the common electrode 21.

Since the first dielectric layer 18 formed of a dielectric multilayer film is disposed above the pixel electrode 9a (between the pixel electrodes 9a and the first alignment film 16), the second dielectric layer 28 formed of at least one film is correspondingly formed on the common electrode 21 (between the common electrode 21 and the second alignment film 26).

The second dielectric layer 28 formed of any of the dielectric films described above can be used to match or approximate the work function of the pixel electrodes 9a to the work function of the common electrode 21. Thus, even in alternating current operation of the liquid crystal layer 50, a symmetric or substantially symmetric electric field can be applied to the liquid crystal layer 50. Thus, in the electro-optical device 100, displaying a certain pattern for a long period of time does not cause burn-in.

A second dielectric layer 28 formed of a silicon oxide film can be advantageously formed using the same material as used in a process for manufacturing the first substrate 10. When the uppermost dielectric film of the first dielectric layer 18 and the uppermost dielectric film of the second dielectric layer 28 are formed of the same material, the work function of the pixel electrodes 9a can be substantially the same as the work function of the common electrode 21. Thus, a symmetric or substantially symmetric electric field can be applied to the liquid crystal layer 50. This can reliably prevent burn-in in the electro-optical device 100.

While the second dielectric layer 28 may be formed of one or a plurality of dielectric films, the second dielectric layer 28 is preferably formed of a single dielectric film. A decrease in the capacity of the second dielectric layer 28 disposed on the common electrode 21 will reduce the voltage applied to the liquid crystal layer 50. Thus, a second dielectric layer 28 formed of a single dielectric film can increase the capacity of the second dielectric layer 28. This can prevent a reduction in the voltage applied to the liquid crystal layer 50. Thus, the liquid crystal layer 50 can be suitably operated without increasing the operation voltage.

Method for Manufacturing First Substrate 10 of Electro-Optical Device 100

With reference to FIGS. 4 and 5, a method for manufacturing an electro-optical device 100 according to an embodiment of the invention will be described below. The structure of the electro-optical device 100 is also described in detail. FIGS. 4A to 4D are cross-sectional views illustrating a method for manufacturing an electro-optical device 100 according to an embodiment of the invention from a process for forming a data line 6a, a drain electrode 6b, and a second interlayer insulating film 72 to a process for forming a reflective electroconductive film 9 from which pixel electrodes 9a are to be formed. FIGS. 5A to 5D are cross-sectional views illustrating a method for manufacturing an electro-optical device 100 according to an embodiment of the invention from a process for patterning the reflective electroconductive film 9 to form pixel electrodes 9a to a process for forming a first dielectric layer 18.

Figure 4A:
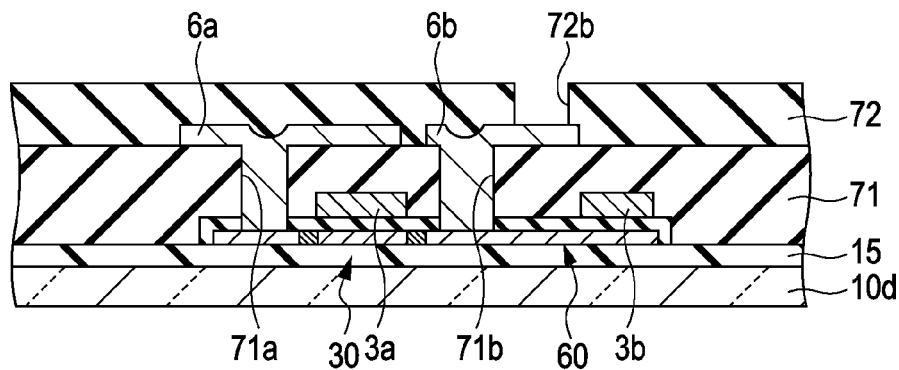
FIGS. 4A to 4D are cross-sectional views illustrating a method for manufacturing an electro-optical device according to an embodiment of the invention from a process for forming a data line, a drain electrode, and an interlayer insulating film to a process for forming a reflective electroconductive film from which pixel electrodes are to be formed.

First, as illustrated in FIG. 4A, a field-effect transistor 30, a data line 6a, and a drain electrode 6b are formed on a first surface 10x of a translucent substrate 10d. A second interlayer insulating film 72 is then formed, for example, using silicon oxide. A contact hole 72b is then formed in the second interlayer insulating film 72 by photolithography and etching techniques.

Figure 4B:
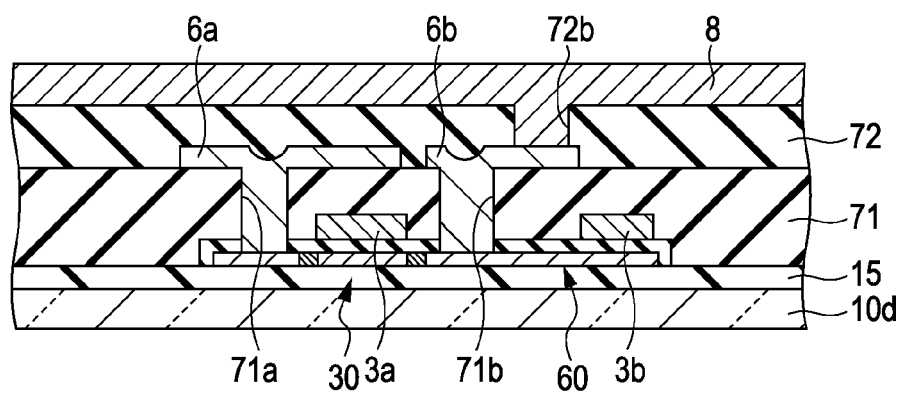
Figure 4C:
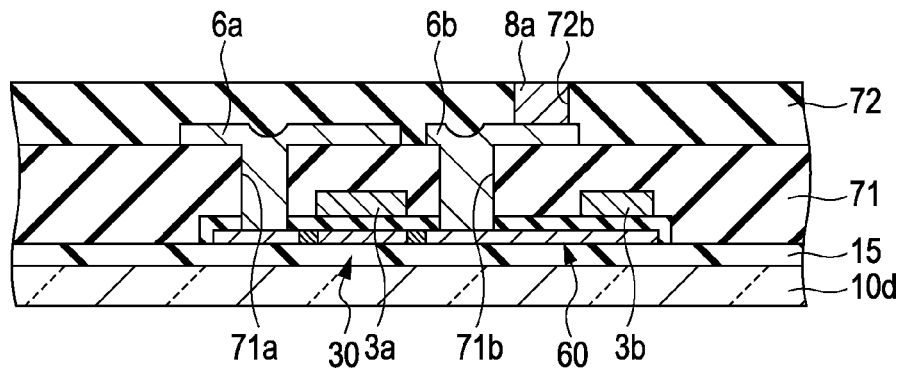

As illustrated in FIG. 4B, in the next plug formation process, a thick electroconductive film 8, for example, formed of molybdenum is formed on the second interlayer insulating film 72. The surface of the electroconductive film 8 is then polished. As illustrated in FIG. 4C, part of the electroconductive film 8 on the second interlayer insulating film 72 is removed, leaving part of the electroconductive film 8 in the contact hole 72b as a plug 8a. The polishing may be chemical mechanical polishing. In chemical mechanical polishing, the action of chemical components in a polishing liquid and the movement of an abrasive on the translucent substrate 10d can provide a smooth surface rapidly. More specifically, an polishing cloth (pad) mainly composed of nonwoven fabric, expanded polyurethane, and porous fluorocarbon resin disposed on a surface plate of a polishing apparatus is rotated relative to a holder for holding the first substrate 10. During the rotation, an abrasive, which may contain cerium oxide particles having an average size in the range of 0.01 to 20 µm, an acrylate derivative serving as a dispersing agent, and water, is fed between the polishing cloth and the translucent substrate 10d.

Figure 4D:
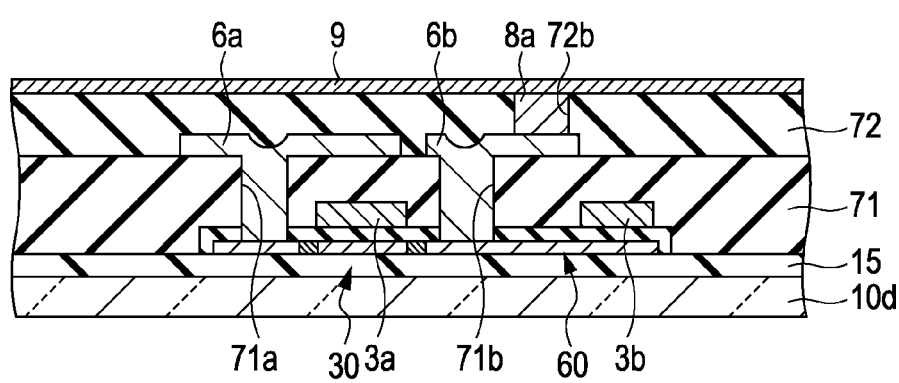
Figure 5A:
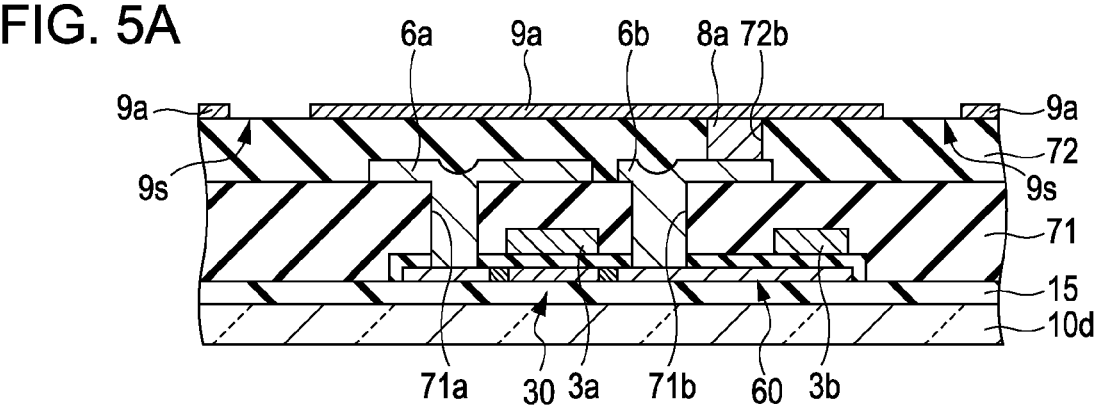
FIGS. 5A to 5D are cross-sectional views illustrating a method for manufacturing an electro-optical device according to an embodiment of the invention from a process for patterning the reflective electroconductive film to form pixel electrodes to a process for forming a first dielectric layer.

As illustrated in FIG. 4D, in a pixel electrode formation process, a reflective electroconductive film 9 formed of an aluminum material is formed on a flat surface of the second interlayer insulating film 72 and the plug 8a. As illustrated in FIG. 5A, the reflective electroconductive film 9 is then patterned by photolithography and etching techniques to form island-shaped pixel electrodes 9a.

Figure 5B:
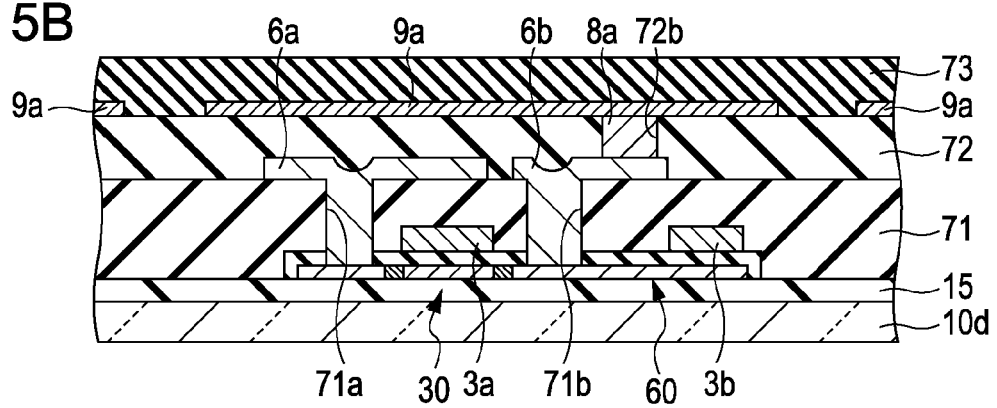
Figure 5C:
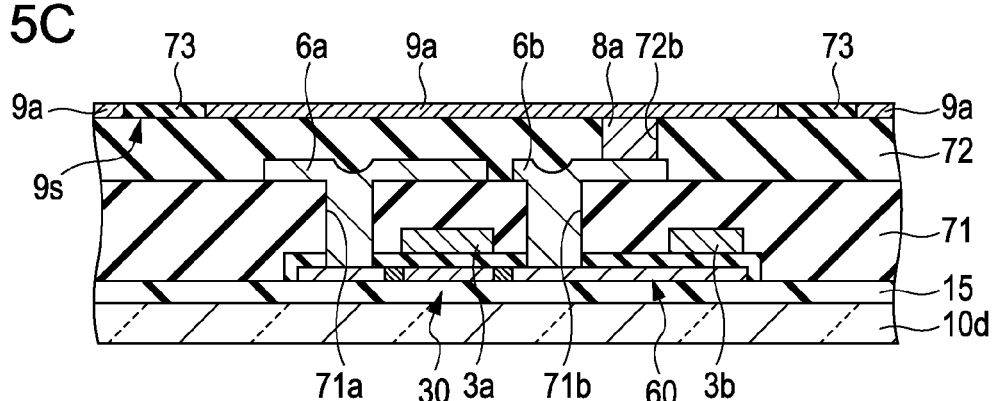

As illustrated in FIG. 5B, in a surface insulating film formation process, a surface insulating film 73 is formed on the pixel electrodes 9a and part of the second interlayer insulating film 72 exposed between the adjacent pixel electrodes 9a. As illustrated in FIG. 5C, in a polishing process, the surface insulating film 73 is polished to expose the surfaces of the pixel electrodes 9a. Gaps 9s between the adjacent pixel electrodes 9a remain filled with the surface insulating film 73. The surface insulating film 73 may be polished by chemical mechanical polishing.

Figure 5D:
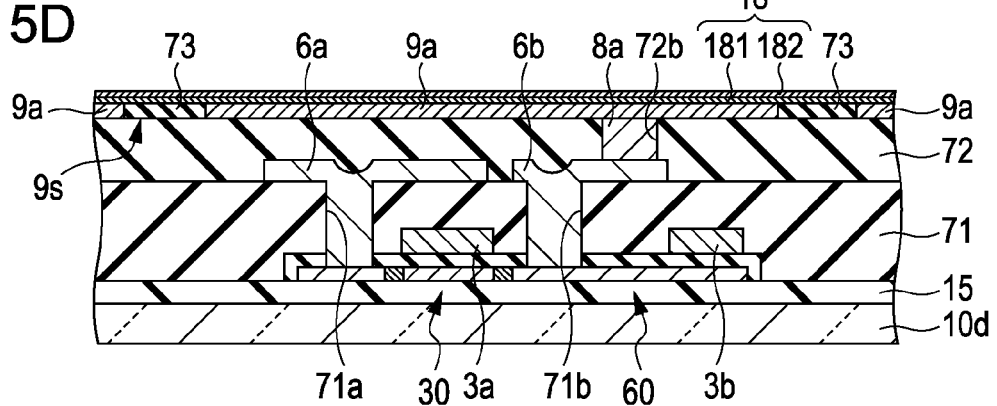

As illustrated in FIG. 5D, in a first dielectric layer formation process, a plurality of dielectric films (a low-refractive index layer 181 and a high-refractive index layer 182) are successively formed on the entire or substantially entire surface of the first substrate 10 covering both the pixel electrodes 9a and the surface insulating films 73, thus forming a first dielectric layer 18 formed of a dielectric multilayer film. The dielectric films may be formed by physical vapor deposition (PVD), such as sputtering, vacuum evaporation, or ion plating, or CVD.

As illustrated in FIG. 3B, a first alignment film 16 formed, for example, of a polyimide film is formed on the first dielectric layer 18 and is subjected to a rubbing process.

Method for Manufacturing Second Substrate 20 of Electro-Optical Device 100

To form the second substrate 20 illustrated in FIG. 3B, a common electrode 21 (translucent electrode) formed of an ITO film is formed on the translucent substrate 20d, and a second dielectric layer 28 is formed on the common electrode 21 on the entire or substantially entire surface of the translucent substrate 20d. Such a dielectric film may be formed by PVD, such as sputtering, vacuum evaporation, or ion plating, or CVD. A second alignment film 26 formed, for example, of a polyimide film is then formed on the second dielectric layer 28 and is then subjected to a rubbing process.

Principal Advantages of the Present Embodiment

As described above, in the electro-optical device 100 according to the present embodiment, the first dielectric layer 18 comprising a plurality of dielectric films (the low-refractive index layer 181 and the high-refractive index layer 182) disposed on the pixel electrodes 9a (reflective electrodes) functions as a reflectance improver film. The pixel electrodes 9a therefore exhibit a high reflectivity. This improves display luminance, providing well-lighted display.

Since the first dielectric layer 18 increases the reflectivity of the pixel electrodes 9a, the pixel electrodes 9a may be formed of an aluminum material. As compared with pixel electrodes 9a formed of a silver material, the pixel electrodes 9a formed of an aluminum material can reduce costs and simplify the patterning process.

According to the present embodiment, since the first dielectric layer 18 (dielectric multilayer film) is formed on the pixel electrodes 9a, burn-in in alternating current operation of the liquid crystal layer 50 can be prevented with a simple structure. More specifically, since the dielectric multilayer film is disposed on the pixel electrodes 9a, the second dielectric layer 28 can be formed on the common electrode 21 to match or approximate the work function of the pixel electrodes 9a to the work function of the common electrode 21. Thus, a symmetric electric field can be applied to the liquid crystal layer 50. Thus, in the electro-optical device 100, displaying a certain pattern for a long period of time does not cause burn-in.

Other Embodiments

In the embodiment described above, the pixel electrode 9a is a reflective electrode, and the common electrode 21 is a translucent electrode. The invention may also be applied to an electro-optical device in which the pixel electrode 9a is a translucent electrode, and the common electrode 21 is a reflective electrode.

As in an electronic device (projection display 1000) described below with reference to FIG. 6A, when the wavelengths of light incident on three electro-optical devices 100 (electro-optical devices 100R, 100G, and 100B) are specified, the predetermined wavelength $\lambda_0$ for the first dielectric layer 18 may be optimally determined for each of the electro-optical devices 100 (electro-optical devices 100R, 100G, and 100B).

Installation Examples in Electronic Device

Figure 6A:
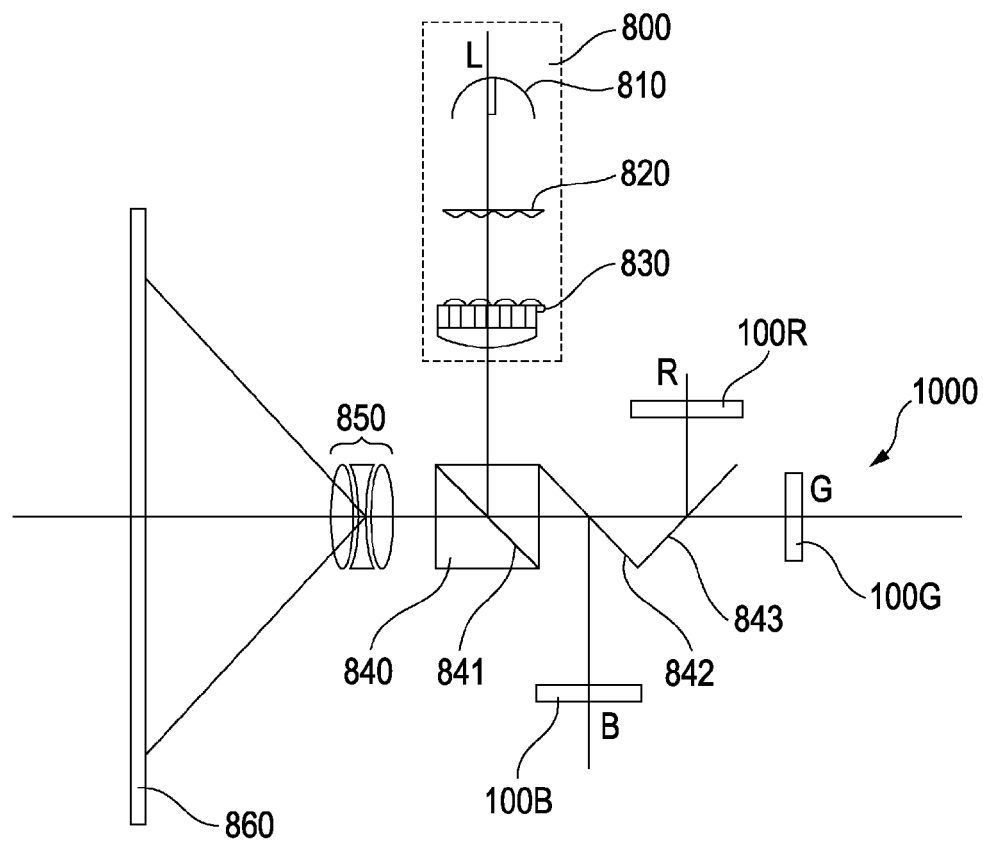
FIGS. 6A to 6C are explanatory drawings of electronic devices that include a reflection-type electro-optical device according to one embodiment of the invention.
Figure 6B:
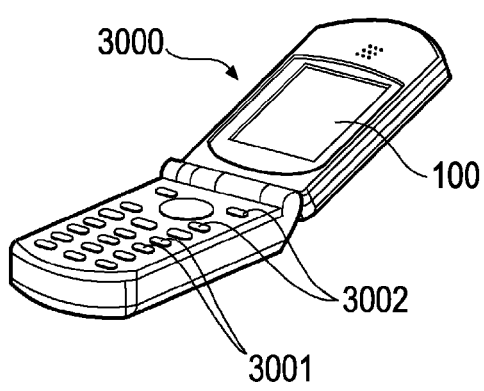
Figure 6C:
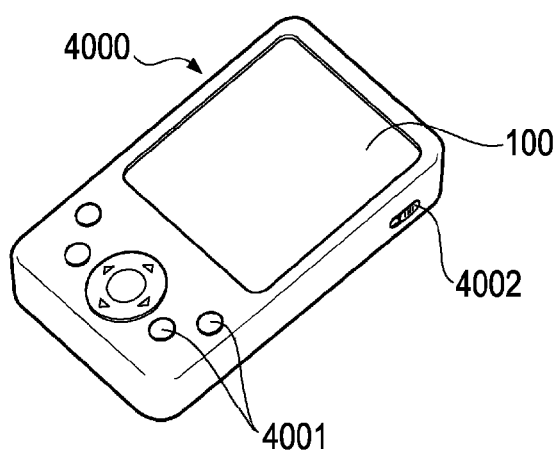

A reflection-type electro-optical device 100 according to an embodiment of the invention can be used in a projection display (liquid crystal projector/electronic device) illustrated in FIG. 6A and portable electronic devices illustrated in FIGS. 6B and 6C.

As illustrated in FIG. 6A, the projection display 1000 includes a polarized light illumination unit 800, which includes a light source 810, an integrator lens 820, and a polarization conversion element 830 disposed along the system optical axis L. The projection display 1000 further includes a polarizing beam splitter 840 having an S-polarized light flux reflector 841, which reflects S-polarized light flux emitted from the polarized light illumination unit 800 along the system optical axis L, a dichroic mirror 842 for separating a blue light (B) component of light reflected from the S-polarized light flux reflector 841, and a dichroic mirror 843 for reflecting and thereby separating a red light (R) component of light flux after the blue light (B) component has been separated. The projection display 1000 further includes three electro-optical devices 100 (electro-optical devices 100R, 100G, and 100B) that the corresponding color light enters. In the projection display 1000, light components modulated by the three electro-optical devices 100R, 100G, and 100B are combined through the dichroic mirrors 842 and 843 and the polarizing beam splitter 840. A projection optical system 850 projects the combined light onto a screen 860.

In an electronic device having such a structure (projection display 1000), the wavelengths of light incident on the three electro-optical devices 100 (electro-optical devices 100R, 100G, and 100B) are specified. Thus, the predetermined wavelength $\lambda_0$ for the optical thickness and of each of the low-refractive index layer 181 and the high-refractive index layer 182 of the first dielectric layer 18 formed on the first substrate 10 may be optimally determined for each of the electro-optical devices 100 (electro-optical devices 100R, 100G, and 100B). In that case, although the electro-optical devices 100R, 100G, and 100B include first dielectric layers 18 having different structures, the formation of the first dielectric layers 18 most suitable for each of the electro-optical devices 100R, 100G, and 100B can improve the brightness of the projection display 1000.

A mobile phone 3000 illustrated in FIG. 6B includes a plurality of operation buttons 3001, scroll buttons 3002, and an electro-optical device 100 as a display. The scroll buttons 3002 are manipulated to scroll the screen of the electro-optical device 100. A personal digital assistant (PDA) illustrated in FIG. 6C includes a plurality of operation buttons 4001, a power switch 4002, and an electro-optical device 100 as a display. The power switch 4002 is turned on to display information items, such as an address book or a schedule note, on the electro-optical device 100.

The formation of a color filter, for example, on the second substrate 20 allows the electro-optical device 100 to display images in color. An electro-optical device 100 with a color filter can be used to manufacture a single panel projection display.

Examples of electronic devices that include an electro-optical device 100 according to the invention include, in addition to those illustrated in FIGS. 6A, 6B, and 6C, head-mounted displays, digital still cameras, liquid crystal televisions, viewfinder- or direct-view-type video tape recorders, car navigation systems, pagers, electronic notebooks, electronic calculators, word processors, workstations, videophones, POS terminals, and banking terminals.

What is claimed is:

1. An electro-optical device comprising:
   a first substrate and a translucent second substrate facing each other;
   a liquid crystal layer disposed between the first substrate and the second substrate;
   a reflective electrode that is disposed between the first substrate and the liquid crystal layer and constitutes one of a pixel electrode and a common electrode;
   a translucent electrode that is disposed between the second substrate and the liquid crystal layer and constitutes the other of the pixel electrode and the common electrode;
   a first dielectric layer that is disposed between the reflective electrode and the liquid crystal layer and includes a plurality of dielectric films; and
   a second dielectric layer that is disposed between the translucent electrode and the liquid crystal layer and includes at least one dielectric film.

2. The electro-optical device according to claim 1, wherein a dielectric film adjacent to the liquid crystal layer in the first dielectric layer is formed of the same material as a dielectric film adjacent to the liquid crystal layer in the second dielectric layer.

3. The electronic device comprising the electro-optical device according to claim 2.

4. The electro-optical device according to claim 1, wherein the second dielectric layer comprises only the one dielectric film.

5. The electronic device comprising the electro-optical device according to claim 4.

6. The electro-optical device according to claim 1, wherein the reflective electrode constitutes a pixel electrode, and the translucent electrode constitutes a common electrode.

7. The electronic device comprising the electro-optical device according to claim 6.

8. The electro-optical device according to claim 1, wherein the reflective electrode is formed of an aluminum material.

9. The electronic device comprising the electro-optical device according to claim 8.

10. An electronic device comprising the electro-optical device according to claim 1.

11. The electronic device according to claim 10, further comprising: a light source for providing light to the electro-optical device; and a projection optical system for projecting light modulated by the electro-optical device.

* * * * *